United States Patent [19]

Koga et al.

[11] Patent Number: 4,463,390
[45] Date of Patent: Jul. 31, 1984

[54] SPECIAL EFFECTS NOISE REDUCTION IN A ROTARY HEAD REPRODUCTION APPARATUS

[75] Inventors: Yoshio Koga; Takafumi Inadomi, both of Nagaokakyo, Japan

[73] Assignee: Mitsubishi Denki Kabushiki Kaisha, Tokyo, Japan

[21] Appl. No.: 368,086

[22] Filed: Apr. 13, 1982

[30] Foreign Application Priority Data

Apr. 30, 1981 [JP] Japan ................................. 56-67175

[51] Int. Cl.³ ........................................... H04N 5/783
[52] U.S. Cl. ..................................... 360/10.3; 360/73
[58] Field of Search .................... 360/10.1, 10.2, 10.3, 360/77, 78, 70, 75, 73; 358/312

[56] References Cited

U.S. PATENT DOCUMENTS

| | | | |
|---|---|---|---|
| 4,268,875 | 5/1981 | Morio et al. | 358/312 |
| 4,268,876 | 5/1981 | Sakamoto et al. | 360/10.2 |
| 4,318,140 | 3/1982 | Shigeta | 360/10.3 |
| 4,328,518 | 5/1982 | Kawata et al. | 360/10.3 |

Primary Examiner—Donald E. McElheny, Jr.
Attorney, Agent, or Firm—Lowe, King, Price & Becker

[57] ABSTRACT

A magnetic video reproducing apparatus employing a well-known rotational two-head system, a helical scan system and an azimuth system is adapted to make high speed reproduction of a magnetic tape (2) having a video signal recorded in video tracking pitches larger than the width of the reproducing heads and comprises a capstan servo circuit (15) including speed ratio setting circuits (17, 20), a phase control circuit (19) and a speed control circuit (21), wherein the traveling speed of the magnetic tape (2) for high speed reproduction is adapted to be precisely an odd number of times for normal speed reproduction. The speed control circuit (21) is made to accurately control the traveling speed of the magnetic tape (2) to be of the prescribed value. The phase control circuit (19) is made to control the traveling phase of the magnetic tape (2) to be constant.

11 Claims, 38 Drawing Figures

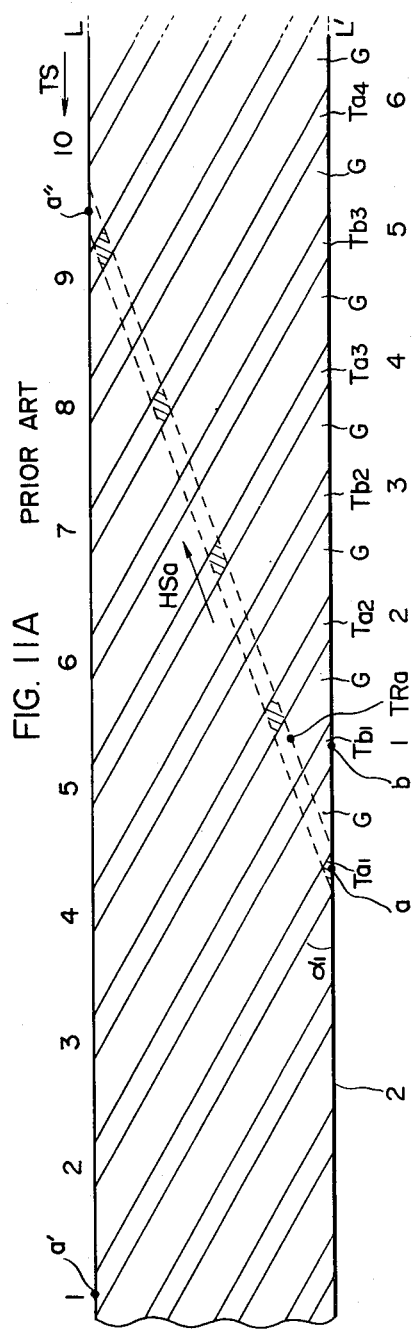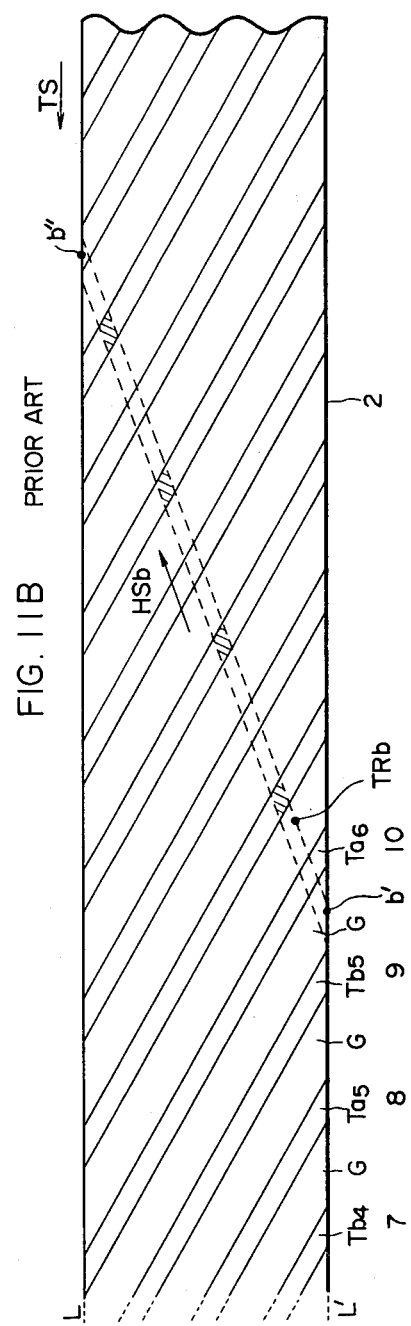

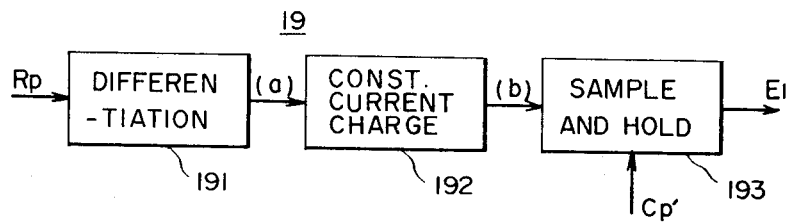
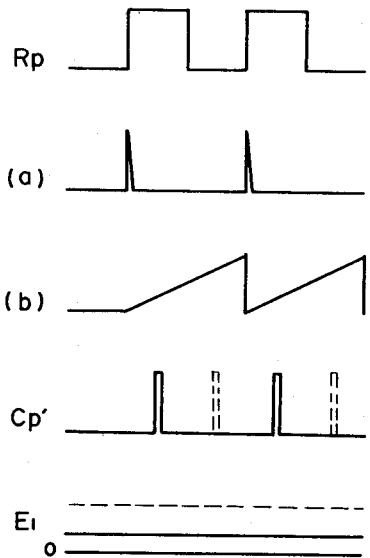
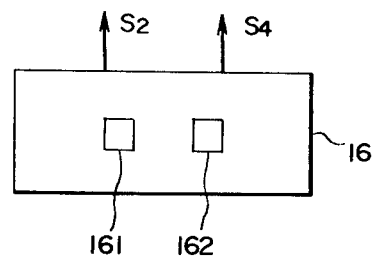
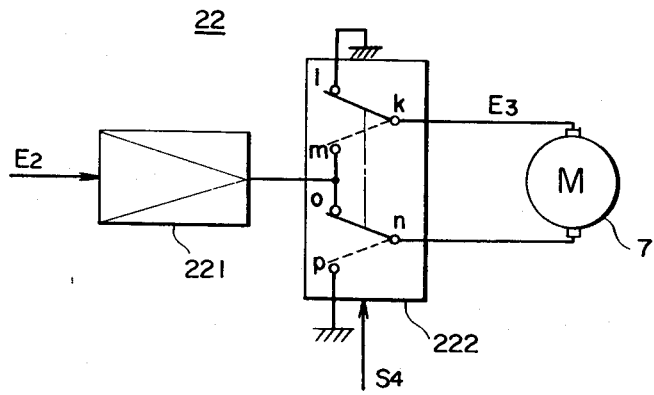

SPECIAL EFFECTS NOISE REDUCTION IN A ROTARY HEAD REPRODUCTION APPARATUS

BACKGROUND OF THE INVENTION

1. Field of the Invention

The present invention relates to a magnetic video reproducing apparatus. More specifically, the present invention relates to an improvement in a magnetic video reproducing apparatus for reduction of noise occurring on a monitoring picture on the occasion of high speed reproduction.

2. Description of the Prior Art

A magnetic video tape recording/reproducing apparatus for home use so far proposed and put into practical use typically employs a rotational two-head system, a helical scan system and an azimuth system. By a rotational two-head system is typically meant a system in which two video heads are provided at the directly opposite positions on the circumference of a rotating drum spaced apart by 180° from each other. By a helical scan system is typically meant a system in which a magnetic tape is made to travel in an oblique direction with respect to the rotational direction of the video heads. By an azimuth system is typically meant a system in which the gap directions of the above described two heads are each afforded a different angle so that the corresponding directions on the recorded tracks recorded by the above described two heads on a magnetic tape may be different and hence may intersect each other. The above described rotational two-head system, helical scan system and azimuth system have been fully described in, for example, U.S. Pat. No. 3,925,810 issued Dec. 9, 1975 to Yoshio Ishigaki et al; U.S. Pat. No. 3,812,523 issued May 21, 1974 to Hisaaki Narahara; U.S. Pat. No. 4,012,771 issued Mar. 15, 1977 to Yoshio Ishigaki et al; U.S. Pat. No. 3,918,085 issued Nov. 4, 1975 to Toshihiko Numakura et al, and U.S. Pat. No. 4,079,412 issued Mar. 14, 1978 to Yoshiteru Kosaka.

Since the above described three systems constitute the background of the present invention, an outline of these three systems will be briefly described to the extent necessary for description of the present invention.

FIG. 1 is a diagrammatic view showing the rotational two-head system. Two video heads Ha and Hb are provided on the circumference of a rotational drum 1 at the directly opposite positions spaced apart by 180° from each other. Since the rotational drum 1 is caused to be rotated at a high speed, say 1,800 rpm, in the arrow direction as viewed in FIG. 1, the two video heads Ha and Hb are correspondingly rotated at a high speed. A magnetic tape 2 is set around the rotational drum 1 to be in an Ω shape to extend along more than a half of the circumference. The magnetic tape 2 is pinched between a capstan 3 and a pinch roller 4 so that the tape 2 may be made to travel by means of the capstan 3. For convenience of description of the operation, it is now assumed that the travel of the magnetic tape 2 in the solid line arrow direction is referred to as "winding" and the travel of the magnetic tape 2 in the dotted line arrow direction is referred to as "rewinding".

FIG. 2 is a diagrammatic view showing a helical scan system. The magnetic tape 2 is fed around the circumference of the rotational drum 1 in an oblique direction with respect to the axial direction of the rotational drum 1. Accordingly, it follows that the video heads Ha and Hb rotate in an oblique direction with respect to the travel direction of the magnetic tape 2. Therefore, the video heads Ha and Hb trace the magnetic tape 2 in the corresponding oblique direction. The rotational drum 1 is rotatably provided on a fixed cylindrical drum 6 having the same diameter as the rotational drum 1 with a small slit 5 between the rotational drum 1 and the fixed cylindrical drum 6.

FIGS. 3A and 3B are diagrammatic views showing an azimuth system. The video heads Ha and Hb each have gaps Ga and Gb, respectively, and are adapted to be rotated and hence to move in the arrow direction as viewed in FIGS. 3A and 3B. The gaps Ga and Gb of the heads Ha and Hb, respectively, are formed with a small oblique angle $\theta$ but in the opposite directions with respect to the direction normal to the rotational direction. The above described small oblique angle $\theta$ is referred to as an azimuth angle and is typically selected to be say 6°. As to be more fully described subsequently, the azimuth system is employed to reduce a cross talk. The width of each of these video heads Ha and Hb is denoted by the character W.

A typical video tape recording/reproducing apparatus for home use so far proposed and put into practical use is typically designed to have three recording/reproduction modes, which are referred to as a standard play mode, a long play mode, and an extended play mode. The standard play mode is adapted to perform recording/reproduction of one standard magnetic tape for two hours. The long play mode is adapted to perform recording/reproduction of one standard magnetic tape for a period of time as long as two times that of the standard play mode. The extended play mode is adapted to perform recording/reproduction of one standard magnetic tape for a period of time as long as three times that of the standard play mode. Since the differences of the long play mode and the extended play mode are similar to each other, except for a difference in a recording/reproduction time period of two times in the long play mode and three times in the extended play mode, only the standard play mode and the extended play mode will be described in the following for facility of description.

FIG. 4 is a diagrammatic view showing a pattern of recorded tracks as viewed from the standpoint of a magnetic aspect generated in recording of the standard play mode. It is to be pointed out that the tape patterns shown in the tape pattern diagrams of the present application are all similarly illustrated from the magnetic aspect. As seen from FIG. 4, the magnetic tape 2 includes video tracks Ta and Tb, a control track Tc and an audio track, (not shown), for simplicity of illustration. On the occasion of recording and reproduction, the magnetic tape 2 is taken or wound in the direction of the arrow TS at a constant speed of say 33.35 mm/s. Since the above described helical scan system is employed, the video heads Ha and Hb are rotated or moved in the direction as shown by the arrow HS obliquely by a predetermined angle with respect to the tape traveling direction. On the occasion of recording, a video signal is recorded on the video tracks Ta and Tb by means of the video heads Ha and Hb, respectively, and on the occasion of reproduction the video signal thus recorded is reproduced by means of the respective video heads while the same trace the above described video tracks Ta and Tb. Thus, it follows that the video tracks Ta and Tb are formed with an oblique angle $\alpha 1$ with respect to the tape traveling direction. Although the angle $\alpha 1$ was illustrated as if it were considerably large for facility of depiction, in actuality the angle $\alpha 1$ is as extremely small as approximately 5°59'. The video tracks Ta and Tb each represent one odd numbered field and one even numbered field of a television picture. As well-known a composition of the odd numbered field and the even numbered field constitute one frame. A video tape recording/reproducing apparatus without employing an azimuth system needs formation of a guard band having no video signal recorded between the adjacent video tracks Ta and Tb for the purpose of eliminating a cross talk between the adjacent video tracks Ta and Tb. However, employment of the azimuth system eliminates necessity of forming a guard band and makes it possible to record a video signal in the video tracks Ta and Tb without a guard band therebetween by eliminating a problem of cross talk therebetween. More specifically, in the case of the azimuth system where no guard band is formed, even if one video head, say Ha traced the adjacent video track, say Tb, a video signal is little reproduced from the adjacent video track, say Tb due to the above described difference between the gap angles for recording. Such loss of a video signal being reproduced from the adjacent video track is referred to as an azimuth loss and such azimuth loss is as large as approximately −40 dB for a video signal of 4 MHz, for example, which means that employment of the azimuth system without a guard band considerably reduces a cross talk. In performing the standard play mode, usually video heads particularly designed for a standard play mode are used. Assuming that the width of each of the video heads designed for a standard play mode is W1, say 58 $\mu$m, then the width of each video track accordingly becomes W1. Since there is no gap between the adjacent video tracks, the pitch P1 of the video tracks also becomes equal to W1. Meanwhile, in actual video tape recording/reproducing apparatuses the width of these two video heads is selected to be slightly larger than the width of the video tracks for the purpose of slow reproduction, still reproduction and the like and furthermore the width value of each of the two video heads is selected to be different from each other. For example, in the case where the width of the video tracks is selected to be 58 $\mu$m, the width of the video head Ha is selected to be 70 $\mu$m and the width of the video head Hb is selected to be 90 $\mu$m. However, for facility of description, now it is assumed that the width of each video head is selected to be equal to each other and is selected to be 58 $\mu$m. It is pointed out that the above described assumption does not make any difference in description of the operation principle. Typically, the control track Tc is adapted to have a control pulse Cp recorded for the purpose of rotational phase control of the rotational drum 1 and travel phase control of the magnetic tape 2. The control pulse Cp is a pulse signal of say 30 Hz. Assuming that the traveling speed of the magnetic tape is 33.35 mm/s, the interval of the adjacent control pulses would be approximately 1.11 mm.

FIG. 5 is a diagrammatic view of a tape pattern recorded in the extended play mode. Now only a different point of the FIG. 5 tape pattern from the FIG. 4 tape pattern will be described. The magnetic tape 2 is wound in the direction of the arrow TS at a predetermined speed, say 11.12 mm/s which is as small as one-third of that of the standard play mode. The rotational speed of the video heads Ha and Hb remains the same as that in the standard play mode. Accordingly, the angle $\alpha 2$ of the video tracks Ta and Tb with respect to the tape traveling direction becomes different from the angle $\alpha 1$ attained in the standard play mode. However, since such difference in angle is extremely small, in the following the operation is considered on the assumption that there is no difference in the angle between the standard play mode and the extended play mode. In the extended play mode the video heads particularly designed for an extended play mode are used. The width W2 of the video heads for use in the extended play mode is selected to be as small as say 19.3 $\mu$m and one-third of the width W1 of the video heads for use in the standard play mode. Accordingly, the width W2 of the video tracks would become one-third of the width W1. Since there are no gaps between the adjacent video tracks, as described previously, it follows that the pitch P2 of the video tracks also becomes equal to the width W2. The control pulse Cp in the extended play mode is the same as that in the standard play mode and is a pulse signal of 30 Hz. Accordingly, assuming that the traveling speed of the magnetic tape is 11.12 mm/s, the interval of the adjacent pulses as recorded would be approximately 0.37 mm.

In the foregoing the standard play mode and the extended play mode of a typical magnetic video recording/reproducing apparatus were described. Now the respective features of both modes will be briefly described. Generally speaking, in the standard play mode the width of the video tracks is broader and the quality of the reproduced picture is better but the tape traveling speed is large and the time for recording and reproduction of one standard tape becomes short and hence the standard play mode is less economical. On the other hand, in the extended play mode the tape traveling speed is small and the recording/reproducing time period is prolonged and thus the extended play mode is more economical, although the width of the video tracks becomes small and hence the picture quality becomes less good.

In actually using such a magnetic video recording/reproducing apparatus, some users prefer a better picture quality at the sacrifice of a shortened recording/reproducing time and hence of less economy, whereas conversely other users prefer a prolonged recording/reproducing time and hence more economy at the sacrifice of a less good picture quality. However, it is not economical to provide two magnetic video recording/reproducing apparatuses one particularly designed for a standard play mode and the other particularly designed for an extended play mode. Thus, it is desired that a magnetic video recording/reproducing apparatus capable of performing both a standard play mode and an extended play mode is provided.

One approach to realize the above described desire of a magnetic video recording/reproducing apparatus capable of performing both a standard play mode and an extended play mode is to employ rotational four heads in a rotational head assembly, one pair of heads being particularly designed for a standard play mode and the other pair of heads being particularly designed for an extended play mode. FIG. 6 is a diagrammatic view showing the rotational four heads. One pair of video heads Ha and Hb is disposed on the circumference of the rotational drum 1 at directly opposite positions so as to be spaced apart by 180° from each other and another pair of video heads Ha' and Hb' is also provided on the circumference of the rotational drum 1 so as to be spaced apart by 180° from each other but dislocated by 90° as compared with the previously described pair of heads Ha and Hb. Of these two pairs of video heads, for example the pair of video heads Ha and Hb is particularly designed for a standard play mode, whereas the other pair of video heads Ha' and Hb' is particularly designed for an extended play mode. As a matter of course, one of these pairs of heads is selected in operation. On the occasion of reproduction, for the purpose of automatic selection between these two pairs of heads use may be made of the fact that as described previously the interval of the control pulse Cp in the standard play mode is larger than that in the extended play mode. A tape pattern in the case where a video signal is recorded using the pair of video heads Ha and Hb particularly designed for a standard play mode is as shown in FIG. 4, whereas a tape pattern in the case where a video signal is recorded by the other pair of video heads Ha' and Hb' particularly designed for an extended play mode is as shown in FIG. 5.

Another desire which arises in using such a magnetic video recording/reproducing apparatus is a high speed reproduction mode. By a high speed reproduction mode is typically meant a mode in which reproduction is made of a magnetic tape at a high speed as compared with that of an ordinary reproduction mode, i.e. a mode of reproduction of a magnetic tape at the same speed as that in recording. For simplicity of description, let it be assumed that the ratio of the tape travel speed on the occasion of the high speed reproduction mode to that on the occasion of the normal reproduction mode is referred to as "a speed ratio". The high speed reproduction mode includes a high speed winding reproduction mode in which a magnetic tape is recorded as the same is wound and a high speed rewinding reproduction mode in which a magnetic tape is reproduced as the same is rewound. Typically a high speed reproduction mode is used for the purpose of quickly looking for a recorded picture, quickly skipping an undesired portion of the recorded picture, such as a picture for advertisement, when a program is recorded from the commercial television broadcasting.

For the purpose of high speed reproduction usually the capstan 3 for causing a magnetic tape 2 to travel is rotated at a high speed. FIG. 7 is a block diagram showing a conventional capstan motor control circuit for high speed reproduction. The above described capstan 3 is mechanically driven by means of a capstan motor 7. The conventional capstan motor control circuit for high speed reproduction comprises a variable resistor 9, a switch 10 and an amplifier 11. One terminal 8 out of fixed terminals of the variable resistor 9 is supplied with a direct current voltage of an approximately constant voltage, while the other terminal is connected to the ground. A movable terminal of the variable resistor 9 is connected to a contact g of the switch 10. The contact f of the switch 10 is connected to a servo circuit, not shown, for the purpose of the ordinary reproduction mode. A common contact e of the switch 10 is connected to the input of an amplifier 11 and the output of the amplifier 11 is connected to the above described capstan motor 7. On the occasion of the high speed reproduction, the common contact e of the switch 10 is turned to the contact g, whereby the capstan motor 7 is supplied with a high voltage so that the capstan motor 7 is rotated at a high speed. Accordingly, the magnetic tape 2 is also caused to travel at the high speed. If it is desired to change the travel speed of the magnetic tape 2, the variable resistor 9 is adjusted.

The conventional capstan motor control circuit for high speed reproduction is structured as described above and the speed ratio in the high speed reproduction is not accurately controlled to be several times the speed of the normal reproduction mode but is determined roughly to be approximately 9 to 10 times the speed of the ordinary reproduction mode. Such multiple number is very roughly determined to be approximately 9 to 10 in consideration of the desire of the users of a magnetic video recording/reproducing apparatus.

Now description will be made of how a picture appears on the screen when high speed reproduction is made using the above described conventional capstan motor control circuit for high speed reproduction. Since the speed ratio is determined very roughly as described previously, for simplicity of description it is considered how a picture appears on the screen when high speed reproduction is made at the speed as large as approximately 9.5 times the speed of the normal reproduction mode. Further, for facility of illustration, consider a case where a magnetic tape having a video signal recorded in the extended play mode is reproduced in a high speed winding reproduction mode.

FIG. 8 is a diagrammatic view showing loci of the video heads in the case where a magnetic tape having a video signal recorded in an extended play mode is reproduced in a high speed winding reproduction mode at the speed as large as 9.5 times the recording speed, i.e. at the speed ratio of 9.5. For simplicity of illustration, patterns of such a control tracks unnecessary for depiction will be omitted in illustration. In the figure, the arrow TS denotes a tape travel direction, the arrow HSa denotes a rotational direction of the video head Ha' and the arrow HSb denotes a rotational direction of the video head Hb'. As described previously, video tracks Ta1, Tb1, Ta2, Tb2, ... are formed on the tape surface. The video tracks Ta1, Ta2, ... are formed by the video head Ha', whereas the video tracks Tb1, Tb2, ... are formed by the video head Hb'. Now let it be assumed that the video head Ha' starts tracing from the lower end a of the video track Ta1. If and when the speed ratio is unity which means the apparatus is in the ordinary reproduction mode, the video head Ha' traces the video track Ta1 to reach the upper end a' of the video track Ta1. However, since it was assumed that the speed ratio is 9.5, the video head Ha' comes to the upper end a" shown at the upper end of the magnetic tape in FIG. 8, i.e. a point spaced apart from the upper end a' in the direction opposite to the tape travel direction by 9.5 video tracks counting from the track of the upper end a'. The locus TRa of the video head Ha' in such situation is shown by the dotted lines. While the video head Ha traces the tape from the lower end a to the upper end a", only a video signal recorded in the video track Ta is picked up due to the previously described azimuth loss as to the video track Tb. The portion where a video track is picked up on the locus TRa has been hatched. In the case where the speed ratio is the unity, the video head Hb' starts tracing the tape from the lower end b of the video track Tb1. However, since it was assumed that the speed ratio is 9.5, the video head Hb starts tracing the tape from the lower end b', i.e. a point spaced apart by 9.5 video tracks in the direction opposite to the tape traveling direction counting from the video track of the lower end b. As in the case of the video head Ha', the video head Hb' then reaches the upper end b". The locus TRb of the video head Hb' in such situation is shown by the dotted lines. As the video head Hb' traces the video tracks from the lower end b' to the upper end b", as in the case of the video head Ha', only a video signal recorded on the video tracks Tb is picked up due to the azimuth loss as to the video tracks Ta. The portion where the video signal is picked up on the locus TRb has been hatched. In the foregoing the speed ratio of 9.5 was taken only by way of an example. However, as described previously, as a matter of practice the speed ratio cannot be determined precisely to be 9.5 and hence the speed ratio could fluctuate approximately 9 to 10, for example. It would be readily appreciated from the foregoing description that in such a case the spacing between the loci TRa and TRb and the inclination of both loci could change accordingly.

Now description will be made of a picture appearing on the screen in the case where the video heads Ha' and Hb' trace the magnetic tape as described in the foregoing. FIGS. 9A and 9B each show a picture of one field formed by tracing of the respective video heads Ha' and Hb'. FIG. 9C shows a picture of one frame composed with the pictures of both fields. Referring to FIG. 9A, the points a and a" correspond to the points a and a" in FIG. 8, respectively. While the video head is picking up a video signal, a picture portion P appears on the screen and otherwise a noise band N appears on the screen. Meanwhile, for the purpose of reducing any visual interference caused by such noise bands, one might think of an approach to darken corresponding portion on the screen if and when the video head is not picking any video signal. However, such an approach is not successful due to the face that a flickering phenomenon becomes to remarkable to cause users to feel too uncomfortable to make the approach useless. Accordingly, without such approach, it follows that the picture portion P and the noise bands N appear at alternate positions on the screen. The same as FIG. 9A applies to FIG. 9B. However, as is apparent from FIG. 8, the positions of the noise bands N have been slightly dislocated as compared with those in the case of FIG. 9A. Accordingly, the picture shown in FIG. 9C showing a picture of one frame includes the noise bands N the number of which is two times that which appears in FIGS. 9A and 9B. According to the actual experimentation, it has been observed that the noise bands N on the screen are thin stripe patterns which move upward and downward while the number of the stripes increases and decreases. The reason is that some times the noise bands in FIG. 9A and the noise bands N in FIG. 9B come to be overlapped as shown in FIG. 9A and some other times the noise bands N in FIG. 9A and the noise bands in FIG. 9B are dislocated so that the noise band patterns come to appear as shown in FIG. 9C. In spite of such noise bands, a picture itself can be fully observed and as the result the function of the high speed reproduction can be fully achieved.

In the foregoing, a description was made of the case where the magnetic tape having a video signal recorded in an extended play mode is reproduced in a high speed winding reproduction mode. However, substantially the same occurs also in reproduction in a high speed rewinding reproduction mode. Substantially the same also applies to a case where a magnetic tape having a video signal recorded in a standard play mode is reproduced in a high speed winding reproduction mode or a high speed rewinding reproduction mode.

As is fully appreciated from the foregoing description, a magnetic video recording/reproducing apparatus employing a rotational four-head system makes it possible to satisfactorily achieve a function of a high speed reproduction in spite of the fact that several thin noise bands appear on the screen while the same are moving upward and downward on the occasion of high speed reproduction. Nevertheless, employment of a rotational four-head system in a magnetic video recording/reproducing apparatus for home use involves two major serious problems. One is a problem of economy. More specifically, video heads are one of most expensive components in a magnetic video recording/reproducing apparatus and provision of two pairs of video heads on a rotational drum requires an extremely severe precision. Thus, provision of these two pairs of video heads causes an increase of a cost commensurate with one additional pair of heads per se, an increase of a cost commensurate with a video head selecting circuit for selection among these two pairs of video heads, and an increase of a cost required or work of providing one additional pair of heads onto a rotational drum, totaling an increase by several percents of the total costs of a magnetic video recoding/reproducing apparatus. The other problem is wear of a magnetic tape. More specifically, in the case of a rotational four-heads, a magnetic tape is worn by the heads two times faster than the wear which occurs in the case of the rotational two-head system.

In order to evade the above described problems, a magnetic video recording/reproducing apparatus capable of performing recording and reproduction both in a standard play mode and extended play mode using the rotational two-head system has been proposed. Such type of a magnetic video recording/reproducing apparatus of a rotational two-head system employs only one pair of video heads, i.e. video heads Ha' and Hb', having a narrow width particularly designed for an extended play mode and is adapted to record and reproduce a video signal in a magnetic tape with a spacing between the adjacent tracks on the occasion of a standard play mode. FIG. 10 is a diagrammatic view showing a tape pattern having a video signal recorded in a standard play mode using the pair of video heads Ha' and Hb' particularly designed for an extended play mode. The width of the video heads designed for an extended play mode is W2, as described previously, and therefore, the width of the video tracks Ta and Tb also become W2 as in the case of an extended play mode (see FIG. 5). On the other hand, since a magnetic tape is caused to travel in a standard play mode, the pitch between the adjacent video tracks becomes P1 as in the case of a standard play mode (see FIG. 4). Otherwise, the remaining matters are the same as those in a standard play mode described previously. Therefore, according to such a magnetic video recording/reproducing apparatus of a rotational two-head system, a non-signal portion is formed between the adjacent video tracks Ta and Tb and such a non-signal portion may be referred to as "a pseudo-guard band G". Meanwhile, in the case where a video signal is recorded in a magnetic tape in an extended play mode using the above described pair of video heads designed for an extended play mode, the tape pattern becomes as shown in FIG. 5, as a matter of course.

Now a description will be made of high speed reproduction by a magnetic video recording/reproducing apparatus capable of recording and reproduction in both a standard play mode and an extended play mode using the above described rotational two-head system. For the previously described reason, it is also assumed that the speed ratio is selected to be 9.5.

Now consider a case where a magnetic tape having a video signal recorded in an extended play mode is reproduced in a high speed reproduction fashion. In such a case the operation is exactly the same as that in the case where the previously described rotational four-head system is employed. More specifically, the loci of the two video heads becomes as shown in FIG. 8 and the pictures appearing on the screen also become as shown in FIS. 9A, 9B and 9C. Accordingly, several lines of noise bands appear on the screen while the same moves upward and downward. Thus, for the previously described reason, a function of high speed reproduction is fully achieved in such a case.

Now a description will be made of a case where a magnetic tape having a video signal recorded in a standard play mode is reproduced in a high speed reproduction fashion. FIGS. 11A and 11B are diagrammatic views showing the loci of the video heads in the case where a magnetic tape having video signal recorded in a standard play mode is reproduced in a high speed winding reproduction fashion at the speed ratio of 9.5. A different point of the pattern shown in FIGS. 11A and 11B from that in FIG. 8 will now be explained. The tape of FIG. 11A and the tape of FIG. 11B are to be connected along the line L-L'. As in the case of FIG. 8, the video head Ha' starts tracing from the lower end a of the video track Ta1 to reach the upper end a''. The locus TRa of the video head Ha' at that time is shown by the dotted line. While the video head Ha' traces the tape from the lower end a to the upper end a'', only a video signal recorded in the video track Ta is picked up. The portion where a video signal is picked up is shown as hatched on the locus TRa. Similarly the video head Hb' also starts tracing the tape from the lower end b' of the pseudo-guard band G to reach the upper end b''. The locus TRb of the video head Hb' is shown by the dotted line. The portion where a video signal is picked up by the video head Hb' is shown as hatched on the locus TRb. As is appreciated from the foregoing, the portion where a video signal is picked up by the video head is narrow as compared with that in the case of FIG. 8. It is pointed out that for convenience of illustration the oblique angle $\alpha 1$ of the video track has been illustrated in FIGS. 11A and 11B to be larger than the actual case and the portion where a video signal is picked up is observed to be narrow superficially, but in actuality that portion is not so narrow.

Now a picture to appear on the screen in the case where the video heads Ha' and Hb' trace a magnetic tape as described above will be described. FIGS. 12A and 12B are views showing pictures of one field formed when the video heads Ha' and Hb', respectively, trace a magnetic tape. FIGS. 12C and 12D are views showing pictures of one frame attained through composition of the pictures of both fields. Now the difference of the pictures appearing in FIGS. 12A to 12D from those in FIGS. 9A to 9C will be described. Referring to FIG. 12A, picture portions P and noise bands N appear at alternate positions from the upper portion on the screen. Referring to FIGS. 12B, picture portions and noise bands N appear in a manner similar to that in FIG. 12A. However, as is readily seen with reference to FIGS. 11A and 11B, the positions of the noise bands N in FIG. 12B have been considerably dislocated as compared with that in the case of FIG. 12A. As seen from the illustration, the width of the noise bands N in such a case is considerably wide as compared with that of the noise bands shown in FIGS. 9A, 9B and 9C and according to the experimentation it has been observed that the width of these noise bands becomes approximately equal to the width of the picture portions. In addition, as in the case in FIGS. 9A, 9B and 9C, the positions of these noise bands in FIGS. 12A, 12B and 12C move upward and downward and, if and when it happens by chance that the noise bands in FIG. 12A overlap the noise bands in FIG. 12B, a picture pattern as shown in FIG. 12A, for example is seen; however, such overlap rarely occurs, and in most cases the positions of the noise bands in both fields shown in FIGS. 12A and 12B are dislocated to become as shown in FIG. 12C or as shown in FIG. 12D, in which case mostly or only the noise bands appear on the whole screen. In such a case, a function of high speed reproduction can be hardly achieved.

As described in the foregoing, in the case where a magnetic tape having a video signal recorded in a standard play mode using a pair of video heads designed for an extended play mode is reproduced in a high speed reproduction fashion, in most cases the noise bands appear on the whole screen. For this reason no attempt has so far been made to perform high speed reproduction of a magnetic tape having a video signal recorded in a standard play mode using a pair of video heads designed for an extended play mode. Since most of prerecorded video tapes now commercially available have been recorded in a standard play mode using a pair of video heads for a standard play mode, it would be highly advantageous if a magnetic tape having a video signal recorded in a standard play mode can be reproduced in a high speed reproduction fashion using a pair of video heads designed for an extended play mode.

SUMMARY OF THE INVENTION

Briefly described, the present invention comprises a magnetic video reproducing apparatus of a well-known rotational two-head system, a helical scan system and an azimuth system for reproducing a magnetic tape having a video signal recorded with a video track pitch larger than the width of the video heads, comprising an ordinary reproduction mode for reproducing a magnetic tape at an ordinary speed and a high speed reproduction mode for reproducing a magnetic tape at a high speed faster than the ordinary speed, characterized in that means is provided for controlling the travel speed of a magnetic tape on the occasion of the high speed reproduction mode to be precisely an odd number times the travel speed of a magnetic tape on the occasion of the ordinary reproduction mode.

According to the present invention, the travel speed of a magnetic tape on the occasion of the high speed reproduction mode is controlled to be precisely an odd number times the travel speed of a magnetic tape on the occasion of the ordinary reproduction mode. Accordingly, even in the high speed reproduction mode, the two heads trace the magnetic tape with the same phase, with the result that the phases in which the video signal is picked up by the two video heads come to coincide with each other. The tracing by one video head forms a picture of the odd number field on the screen, while the tracing by the other video head forms a picture of the even number field on the screen, in which case the above described control makes it possible that the positions of the noise bands of the odd number field on the screen and the positions of the noise bands of the even number field on the screen come to be fully coincident with each other without much fluctuation. Accordingly, the picture appearing on one frame through composition of the above described two field pictures includes an alternate mixture of picture stripes and noise bands alternately arranged in the vertical direction, in which the width of the picture stripes and the width of the noise bands are approximately the same. The purpose of high speed reproduction is not to observe in detail the whole picture but rather to quickly look for a desired picture as recorded or quickly skip an undesired portion of the recorded picture by roughly looking at the picture. It was observed that such rough watching of a picture can be achieved even by the above described combination of the picture stripes and the noise bands. Therefore, according to the present invention, it was observed that high speed reproduction of a magnetic tape having a video signal recorded with the video track pitch larger than the width of the video heads can be achieved at the sacrifice of a degraded picture quality being a combination of the picture stripes and the noise bands.

Accordingly, a principal object of the present invention is to provide a magnetic video reproducing apparatus which is capable of achieving high speed reproduction of a magnetic tape having a video signal recorded with the video track pitch larger than the width of a pair of video heads using an inexpensive rotational two-head system rather than an expensive rotational four-head system.

One aspect of the present invention resides in a decrease of the cost of a magnetic video reproducing apparatus capable of high speed reproduction of a magnetic tape by eliminating necessity of employment of a rotational four-head system and hence eliminating the necessity of a selecting circuit of four video heads and the necessity of complicated assemblage of four heads in a rotational drum with precision.

Another aspect of the present invention resides in a provision of a compact magnetic video reproducing apparatus by dispensing with a four-head system and a selecting circuit of four heads and also resides in enhancement of reliability due to a decreased number of components.

A further aspect of the present invention resides in a decreased uncomfortable feeling to viewers due to fixed positions of noise bands on the screen on the occasion of high speed reproduction.

Still a further aspect of the present invention resides in a simplified scheme for high speed reproduction of a magnetic tape having a video signal recorded with a video track pitch which is the same as the width of the video heads.

Still a further aspect of the present invention resides in a simplified scheme for high speed reproduction of a magnetic tape having a video signal recorded with the video track width and the video track pitch larger than the width of the video heads.

These objects and other objects, features, aspects and advantages of the present invention will become more apparent from the following detailed description of the present invention when taken in conjunction with the accompanying drawings.

BRIEF DESCRIPTION OF THE DRAWINGS

FIGS. 11A and 11B are views showing the loci of the video heads in the case where a magnetic tape having a video signal recorded in a standard play mode is reproduced in a high speed winding reproduction fashion at the speed ratio of 9.5;

FIG. 15 is a block diagram showing a phase control circuit;

FIG. 16 is a graph showing waveforms of the signals at the various portions in FIG. 14;

FIG 19 is a block diagram of a capstan motor driving circuit;

FIG. 20 is a view showing a mode selecting apparatus;

DESCRIPTION OF THE PREFERRED EMBODIMENTS

Figure 13:
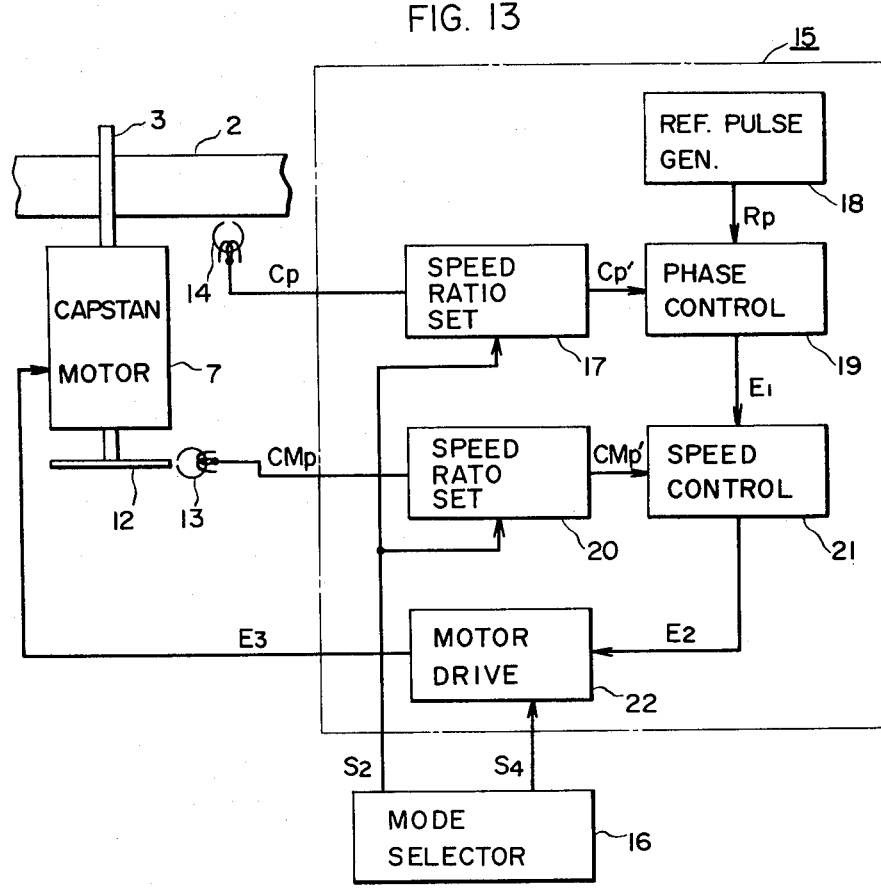
FIG. 13 is a block diagram showing one embodiment of the present invention.

FIG. 13 is a block diagram showing one embodiment of the present invention. The embodiment shown comprises a capstan 3, a capstan motor 7 coupled to drive the capstan 3, a disc 12 coupled to the capstan motor 7, a capstan motor head 13 provided to detect the rotation of the disc 12, a control head 14 provided to detect the travel of a magnetic tape 2, a capstan servo circuit 15 coupled to the capstan motor, the control head 14 and the capstan motor head 13, and a mode selector 16 coupled to the capstan servo circuit 15. The capstan servo circuit 15 comprises speed ratio setting circuits 17 and 20, a reference pulse generating circuit 18, a phase control circuit 19, a speed control circuit 21, and a capstan motor driving circuit 22. The control head 14 is coupled to one input of the speed ratio setting circuit 17. The other input of the speed ratio setting circuit 17 is connected to one output of the mode selector 16. The output of the speed ratio setting circuit 17 is coupled to one input of the phase control circuit 19. The other input of the phase control circuit 19 is coupled to the output of the reference pulse generating circuit 18. The output of the phase control circuit 19 is coupled to one input of the speed control circuit 21. The capstan motor head 13 is coupled to one input of the speed ratio setting circuit 20. The other input of the speed ratio setting circuit 20 is coupled to the other input of the mode selector 16. The output of the speed ratio setting circuit 20 is coupled to the other input of the speed control circuit 21. The output of the speed control circuit 21 is coupled to the input of the capstan motor driving circuit 22. The output of the capstan motor driving circuit 22 is coupled to the capstan motor 7. The capstan 3 and the disc 12 are mechanically coupled to the rotational shaft of the capstan motor 7.

The capstan 3 is rotated by the capstan motor 7. As described previously, a magnetic tape 2 is caused to travel through rotation of the capstan 3. The magnetic tape 2 has a control pulse Cp recorded thereon, as described previously. The control head 14 serves to pick up the above described control pulse Cp, which is then applied to the speed ratio setting circuit 17. The speed ratio setting circuit 17 serves to convert the period of the applied control pulse Cp to a predetermined ratio, whereupon the ratio converted control pulse Cp' is applied to the phase control circuit 19. The phase control circuit 19 serves to compare the phase of the control pulse Cp' with the phase of the reference pulse Rp applied from the reference pulse generating circuit 18, thereby to provide a direct current voltage E1 of the low level when the phase of the control pulse Cp' advances as compared with the phase of the reference pulse Rp and a direct current voltage E1 of the high level when the phase of the control pulse Cp' lags as compared with the phase of the reference pulse Rp. The disc 12 is also rotated by the capstan motor 7. The disc 12 is provided with a plurality of teeth, not shown, formed equispaced along the circumference of the same. It has been adapted such that the intervals of the teeth of the disc 12 have a predetermined relation with the intervals of the control pulse Cp on the above described magnetic tape 2. Now for simplicity of description it is assumed that the intervals of the control pulse Cp on the occasion of the standard play mode are the same as the intervals of the above described teeth of the disc 12. The capstan motor head 13 generates a capstan motor pulse CMp as the disc 12 is rotated and the capstan motor pulse CMp is applied to the speed ratio setting circuit 20. The speed ratio setting circuit 20 serves to convert the period of the applied capstan motor pulse CMp to a predetermined ratio and the resultant capstan motor pulse CMp' is applied to the speed control circuit 21. The speed control circuit 21 serves to provide a direct current voltage E2 of the low level when the period of the applied capstan motor pulse CMp' is smaller and to provide a direct current voltage E2 of the high level when the period of the applied capstan motor pulse CMp' is larger. The speed control circuit 21 also serves to bring the direct current voltage E2 to the low level when the direct current voltage E1 applied from the phase control circuit 19 is the low level and to bring the direct current voltage E2 to the high level when the direct current voltage E1 applied from the phase control circuit 19 is the high level. The capstan motor driving circuit 22 serves to amplify the direct current voltage E2 applied from the speed control circuit 21 and the resultant output direct current voltage E3 is applied to the capstan motor 7. The mode selector 16 includes a plurality of switches for selecting the operation modes. The mode selector 16 serves to provide a high speed reproduction signal S2 of the high level to the speed ratio setting circuits 17 and 20 when the high speed reproduction mode is selected. The speed ratio setting circuit 17 is structured to be responsive to the high speed reproduction signal S2 of the high level to frequency divide the applied control pulse Cp by an odd number such as 9. The speed ratio setting circuit 20 is similarly structured. The mode selecting circuit 16 also serves to provide a reverse rotation signal S4 of the high level to the capstan motor driving circuit 22 when the rewinding mode is selected. The capstan motor driving circuit 22 is responsive to the reverse rotation signal S4 of the high level to invert the polarity of the output voltage. As will be appreciated from the foregoing description, the embodiment shown is structured such that in a high speed reproduction mode the magnetic tape 2 is caused to travel precisely at a speed ratio of an odd number times the speed in the ordinary reproduction mode with a predetermined phase. This essential feature of the embodiment will be described in more detail in the following.

Figure 14:
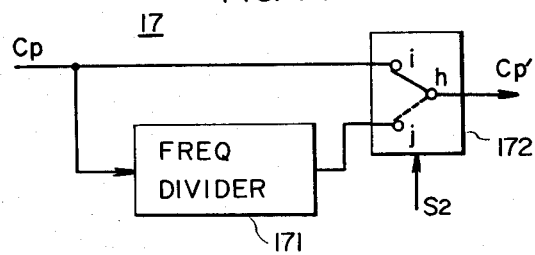
FIG. 14 is a block diagram showing a speed ratio setting circuit.

FIG. 14 is a block diagram of the speed ratio setting circuit 17. The speed ratio setting circuit 17 comprises a frequency divider 171 and a switch 172. The previously described control head 14 is connected to the input of the frequency divider 171 and to the contact i of the switch 172 so that the control pulse Cp may be applied there. The output of the frequency divider 171 is connected to the contact j of the switch 172. The common contact h of the switch 172 is connected to the input of the above described phase control circuit 19. The frequency divider 171 serves to frequency divide the frequencies of the applied control pulse Cp by a given odd number say 9. The switch 172 may comprise a relay, for example, wherein normally the common contact h is turned to the contact i, as shown by the solid line in the figure, and is turned to the contact j, as shown by the dotted line in the figure, upon receipt of the high speed reproduction signal S2 of the high level. Accordingly, the speed ratio setting circuit 17 normally provides the control pulse Cp as such to the phase control circuit 19 and, when the high speed reproduction mode is selected by the mode selector 16, provides to the phase control circuit 19 a frequency divided output obtained by frequency dividing the control pulse Cp by the above described odd number. Since the structure and the operation of the speed ratio setting circuit 20 may be exactly the same as those of the speed ratio setting circuit 17, a repeated description of the speed ratio setting circuit 20 will be omitted.

The reference pulse generating circuit 18 is structured to generate a reference pulse having a frequency of 30 Hz and may comprise a frequency divider structured to frequency divide the pulse signal having the frequency of 3.58 MHz generated by a chrominence circuit usually included in a color magnetic video recording/reproducing apparatus, for example.

FIG. 15 is a block diagram of the phase control circuit 19. FIG. 16 is a graph showing waveforms of the electrical signals at various portions in the FIG. 15 diagram. The phase control circuit 19 comprises a differentiating circuit 191, a constant current charging circuit 192 coupled to the differentiating circuit 191, and a sample and hold circuit 193 coupled to the constant current charging circuit 192. The differentiating circuit 191 serves to differentiate the leading edge of the applied reference pulse Rp to provide a differentiated signal (a) to the constant current charging circuit 192. The constant current charging circuit 192 is responsive to the applied differentiated signal (a) to charge a capacitor with a constant current, thereby to provide a ramp signal such as a sawtooth wave signal (b) to the sample and hold circuit 193. The sample and hold circuit 193 serves to sample/hold the sawtooth wave signal (b) applied to one input thereof as a function of the control pulse Cp' applied to the other input, thereby to provide a direct current voltage E1. If and when the phase of the control pulse Cp coincides with the phase of the reference pulse Rp, the level of the direct current voltage E1 is constant (as shown by the solid line in FIG. 16). However, if and when the phase of the control pulse Cp' lags as compared with the phase of the reference pulse Rp, the level of the direct current voltage E1 becomes the high level (as shown by the dotted line in FIG. 16). On the other hand, if and when the phase of the control pulse Cp' advances as compared with the phase of the reference pulse Rp, the level of the direct current voltage E1 becomes the low level.

Figure 17:
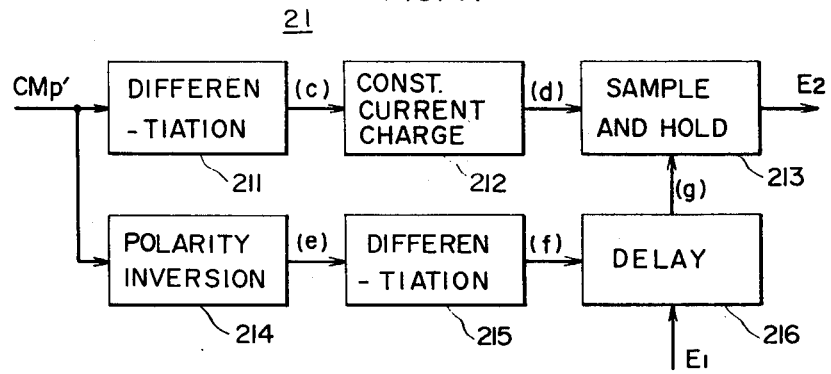
FIG. 17 is a block diagram of a speed control circuit.
Figure 18A:
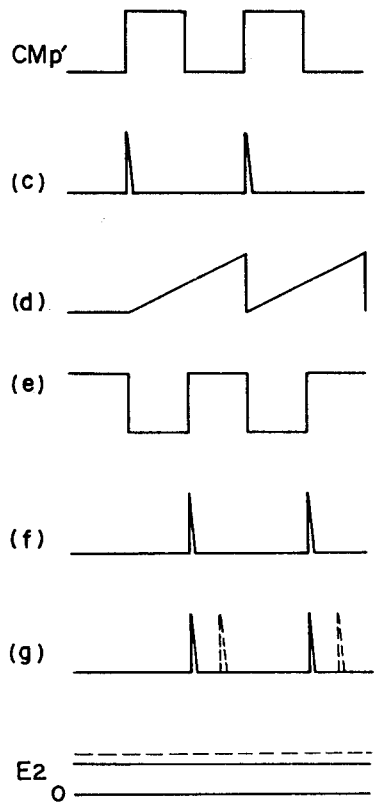
FIGS. 18A and 18B are graphs showing waveforms of signals at various portions in FIG. 17.
Figure 18B:
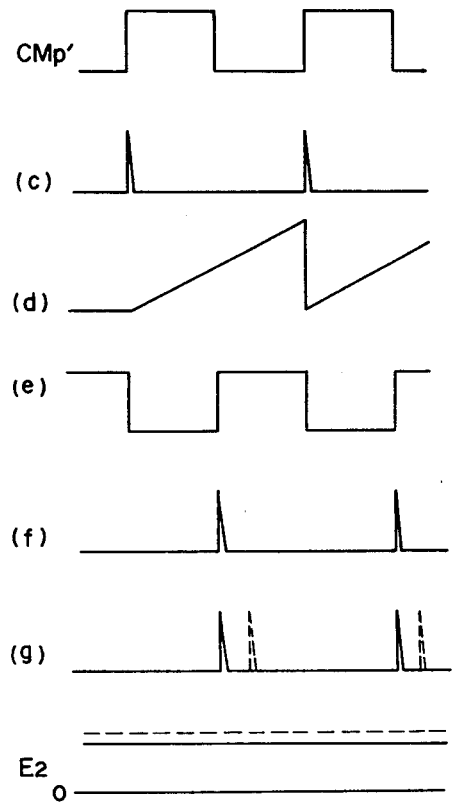

FIG. 17 is a block diagram of the speed control circuit 21. FIGS. 18A and 18B are graphs showing the waveforms of electrical signals at the various portions in the FIG. 17 diagram. The speed control circuit 21 comprises a differentiating circuit 211, a constant current charging circuit 212 coupled to the differentiating circuit 211, a sample and hold circuit 213 coupled to the constant current charging circuit 212, a polarity inverting circuit 214, a differentiating circuit 215 coupled to the polarity inverting circuit 214, and a delay circuit 216 coupled to the differentiating circuit 215 and the sample and hold circuit 213. The differentiating circuit 211 and the polarity inverting circuit 214 are supplied with the above described capstan motor pulse CMp' and the delay circuit 216 is supplied with the direct current voltage E1 obtained from the phase control circuit 19. The differentiating circuit 211 serves to differentiate the leading edge of the applied capstan motor pulse CMp', thereby to provide the differentiated signal (c) to the constant current charging circuit 212. The constant current charging circuit 212 is responsive to the applied differentiated signal (c) to charge a capacitor with a constant current, thereby to provide a sawtooth wave signal (d) to the sample and hold circuit 213. The polarity inverting circuit 214 serves to invert the polarity of the applied capstan motor pulse CMp', thereby to provide the inverted pulse (e) to the differentiating circuit 215. The differentiating circuit 215 serves to differentiate the leading edge of the applied inverted pulse signal (e) to provide the differentiated signal (f) to the delay circuit 216. The delay circuit 216 delays the applied differentiated signal (f) as a function of the level of the direct current voltage E1 applied to the other input, thereby to provide the delayed signal (g) to the sample and hold circuit 213. The delay amount by the delay circuit 216 is controlled so that the same may be small when the level of the direct current voltage E1 is the low level (as shown by the solid line in FIG. 18A) and the same may be large when the level of the direct current voltage E1 is the high level (as shown by the dotted line in FIG. 18A). The sample and hold circuit serves to sample and hold the sawtooth wave signal (d) applied to one input thereof in response to the delay signal (g) applied to the other input thereof, thereby to provide the direct current voltage E2. The larger the delay amount in the delay circuit 216, the larger the level of the direct current voltage E2 (as shown by the dotted line in FIG. 18A). FIG. 18B shows a case where the period of the capstan motor pulse CMp' is large. It would be appreciated that the level of the direct current voltage E2 has become higher than that in the case of FIG. 18A.

FIG. 19 is a block diagram of the capstan motor driving circuit 22. The capstan motor driving circuit 22 comprises an amplifier 221, and a switch 222 coupled to the amplifier 221. The amplifier 221 serves to amplify the applied direct current voltage E2 to the level necessary for driving the capstan motor 7, thereby to provide the direct current voltage E3. The switch 222 may comprise a pair of switches structured to be operable in a ganged fashion. Contacts m and o are both connected to the output of the amplifier 221. Contacts l and p are both connected to the ground. Common contacts k and n are connected to the capstan motor 7. The common contacts k and n are adapted to be operable in a ganged fashion and normally the common contact k is turned to the contact l and the common contact n is turned to the contact o, as shown by the solid line in FIG. 19, whereas the common contact k is turned to the contact m and the common contact n is turned to the contact p, as shown by the dotted line in FIG. 19, if and when the reverse rotation signal S4 of the high level is applied to the switch 222. Accordingly, if and when the reverse rotation signal S4 of the high level is applied, the capstan motor driving circuit 22 serves to invert the polarity of the output voltage E3. FIG. 20 is a schematic diagram of the mode selector 16. The mode selector 16 comprises a high speed winding reproduction mode selecting switch 161 and a high speed rewinding reproduction mode selecting switch 162. The mode selector 16 also comprises other switches for other purposes but a description of these other switches will be omitted inasmuch as these other switches have nothing to do with the present invention. When the high speed winding reproduction mode selecting switch 161 is depressed, the mode selector 16 provides a high speed reproduction signal S2 of the high level. When the high speed rewinding reproduction mode selecting switch 162 is depressed, the mode selector 16 provides a high speed reproduction signal S2 of the high level and a reverse rotation signal S4 of the high level. Now an overall operation of the circuit shown in FIG. 13 will be described based on the foregoing description. Since high speed reproduction is of interest in the present invention, now only the high speed reproduction mode will be described. When the high speed winding reproduction mode selecting switch 161 is depressed in the mode selector 16, the mode selector 16 provides the high speed reproduction signal S2 of the high level to the speed ratio setting circuits 17 and 20. The speed ratio setting circuit 20 is responsive to the high speed reproduction signal S2 to frequency divide the capstan motor pulse CMp obtained from the capstan motor head 13 by a given odd number, thereby to provide the frequency divided capstan motor pulse CMp' to the speed control circuit 21. Since the frequency divided capstan motor pulse CMp' has a period larger than that of the original capstan motor pulse CMp, the speed control circuit 21 increases the level of the direct current voltage E2. The capstan motor driving circuit 22 amplifies the direct current voltage E2, thereby to increase the level of the output direct current voltage E3. As a result, the capstan motor 7 being driven with the direct current voltage E3 starts high speed rotation, thereby to cause the magnetic tape 2 to travel at the high speed. Since the rotational velocity of the capstan motor 7 increases, the rotational velocity of the disc 12 accordingly increases and as a result the period of the capstan motor pulse CMp decreases. The above described operation continues until the period of the capstan motor pulse CMp' comes to completely coincide with that on the occasion of the ordinary reproduction mode. Even if the rotational velocity of the capstan motor fluctuates for some reason, such fluctuation is corrected by means of the above described closed loop. Accordingly, the rotational speed of the capstan motor 7 becomes precisely the given odd number times that on the occasion of the ordinary reproduction mode. As a result, the magnetic tape 2 is also caused to travel precisely at the speed ratio of the given odd number. On the other hand, the travel of the magnetic tape 2 at the speed ratio of the odd number decreases the period of the control pulse Cp being picked up by the control head 14 to be as small as a fraction of one divided by the odd number of that on the occasion of the ordinary reproduction mode. However, since the speed ratio setting circuit 17 frequency divides the control pulse Cp by the odd number the period of the control pulse Cp' obtained from the speed ratio setting circuit 17 remains the same as that on the occasion of the ordinary reproduction mode. Now if and when the traveling phase of the magnetic tape 2 fluctuates, for example lags, for some reason, the phase of the control pulse Cp' applied to the phase control circuit 19 lags as compared with the phase of the reference pulse Rp. Then the phase control circuit 19 provides the direct current voltage E1 of the level higher than that so far attained. As a result, the direct current voltage E2 obtained from the speed control circuit 21 and the direct current voltage E3 obtained from the capstan motor driving circuit 22 become of a higher level. As a result, the rotating phase of the capstan motor 7 advances and accordingly the traveling phase of the magnetic tape 2 advances. Therefore, the traveling phase of the magnetic tape 2 is controlled to be accurately constant by means of the above described closed loop. In the case where the high speed winding reproduction mode selecting switch 162 is depressed in the mode selector 16, the capstan motor 7 is rotated in the reverse direction and substantially the same operation as that in the case of the above described high speed winding reproduction mode is performed, apart from the fact that the magnetic tape 2 is rewound at the high speed.

As described in detail in the foregoing, according to the present invention the magnetic tape 2 is caused to travel as precisely as possible at the speed ratio of a given odd number with a constant phase in the high speed reproduction mode.

Now a description will be made of a case where a magnetic tape having a video signal recorded in a standard play mode is reproduced in a high speed reproduction fashion using the inventive magnetic video reproducing apparatus. It is assumed that the speed ratio is selected to be 9.

Figure 21A:
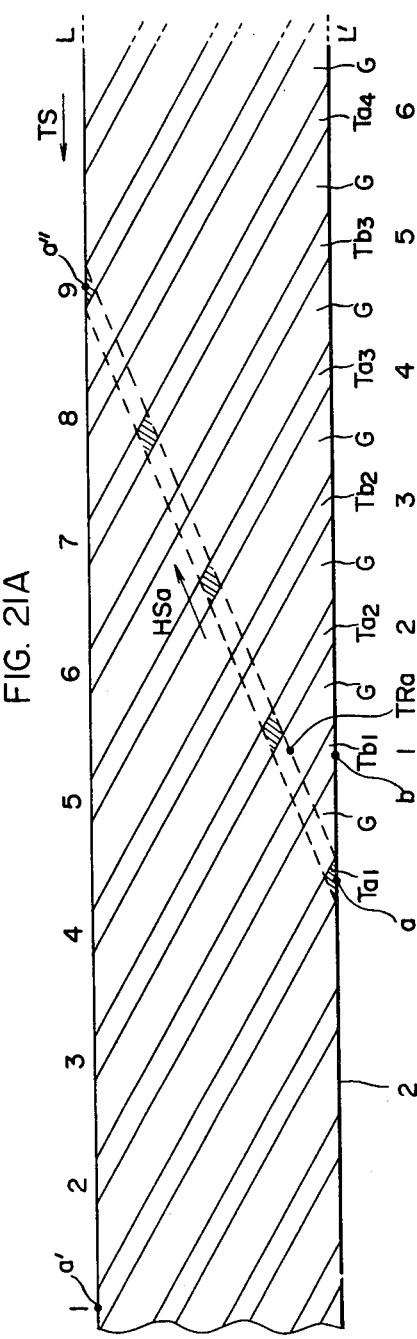
FIGS. 21A and 21B are views showing loci of the video heads in the case where a magnetic tape having a video signal recorded in a standard play mode is reproduced in a high speed winding reproduction fashion at the speed ratio of 9 using the inventive magnetic video reproducing apparatus.
Figure 21B:
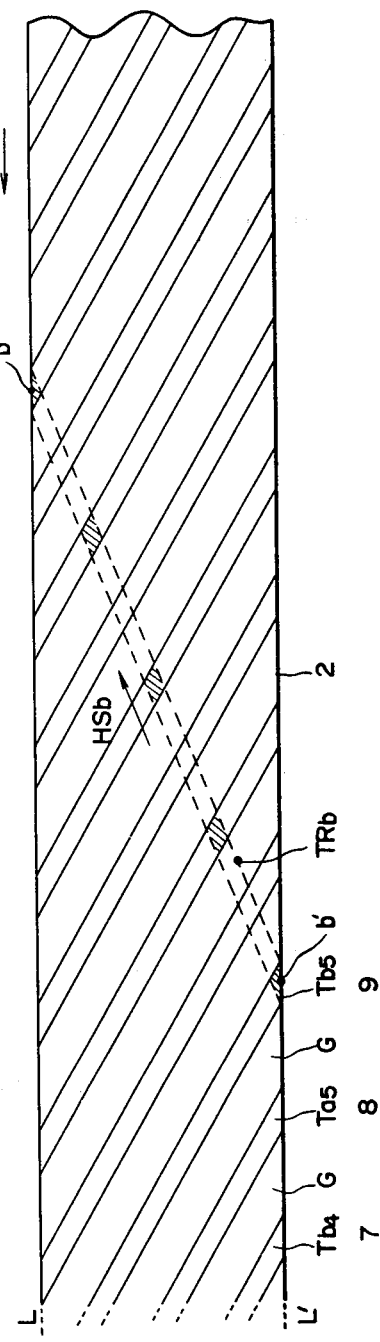

FIGS. 21A and 21B are views showing the loci of the video heads attained in the case where a magnetic tape having a video signal recorded in a standard play mode is reproduced in a high speed winding reproduction fashion at the speed ratio of nine using the inventive magnetic video reproducing apparatus. The differences of the views in FIGS. 21A and 21B from the views in FIG. 11A and 11B will be mainly described. The video head Ha' starts tracing from the lower end a of the video track Ta1 to reach the upper end a''. The portions where a video signal is picked up by the video head Ha' at that time have been hatched on the locus TRa. The video head Hb' starts tracing from the lower end b' of the video track Tb5 to reach the upper end b''. The portions where a video signal is picked up by the video head Hb' at that time have been hatched on the locus TRb. As is apparent through comparison with FIGS. 21A and 21B, the patterns of the loci TRa and TRb are exactly the same and the positions where the video signal is picked up by the video heads are also exactly the same. In addition, this relation remains unchanged through the phase control and speed control of the magnetic tape as described in the foregoing. This point is a decisive difference of the views shown in FIGS. 21A and 21B from the views shown in FIGS. 11A and 11B.

Figure 12A:
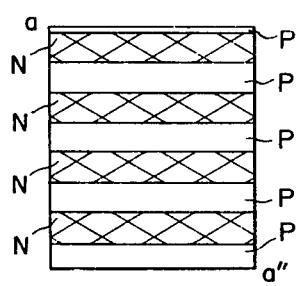
FIGS. 12A and 12B are views showing a picture of one field formed by tracing by the video heads Ha' and Hb', respectively.
Figure 12B:
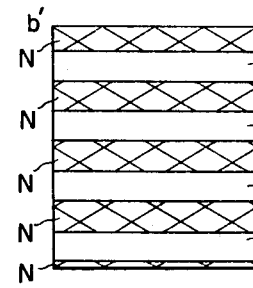
Figure 12C:
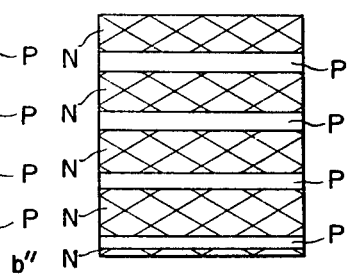
FIGS. 12C and 12D are views showing a picture of one frame through composition of the pictures of both fields.
Figure 12D:
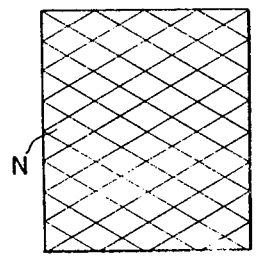
Figure 22A:
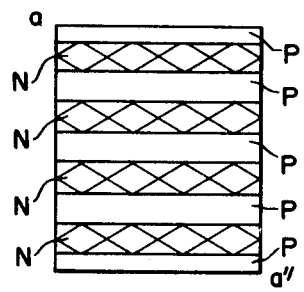
FIGS. 22A and 22B are views showing a picture of one field formed through tracing by the video heads Ha' and Hb', respectively.
Figure 22B:
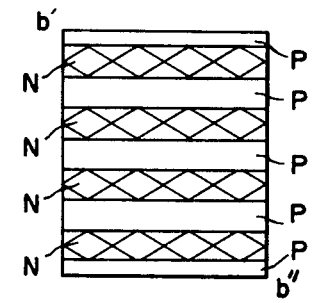
Figure 22C:
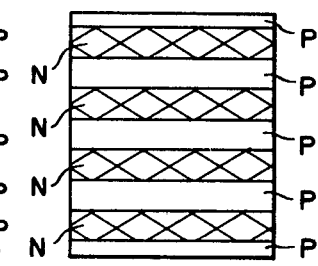
FIG. 22C is a view showing a picture of one frame through composition of the pictures of both fields.

Now a description will be made of a picture on the screen in the case where the video heads Ha' and Hb' trace the magnetic tape in the above described manner. FIGS. 22A and 22B are views each showing a picture of one field formed by tracing of the magnetic tape by each of the video heads Ha' and Hb'. FIG. 22C is a view showing a picture of one frame through composition of the pictures of both fields. Now the differences of the views shown in FIGS. 22A, 22B and 22C from the views shown in FIGS. 12A, 12B and 12C will be mainly described. Referring to FIG. 22A, the picture portions P and the noise bands N appear at the alternate positions from the upper portion on the screen. The same arrangement of the picture portions P and the noise bands N of the FIG. 22A picture also appears in the FIG. 22B picture. In addition, as seen from FIGS. 21A and 21B, the positions of the noise bands N of the FIG. 22A picture are exactly the same as those in the FIG. 22B picture. Furthermore, this relation remains not changed at all as described previously. Accordingly, the picture of one frame formed through composition of the pictures of the above described two fields becomes as shown in FIG. 22C. This point is a decisive difference of the same from that shown in FIG. 12C.

As seen from FIG. 22C, if and when a magnetic tape having a video signal recorded in a standard play mode is reproduced in a high speed rewinding reproduction fashion at the speed ratio of 9 using the inventive magnetic video reproducing apparatus, the picture portions P and the noise bands N appear at the alternate positions on the screen. According to the experimentation, it has been observed that the ratio of the width of the picture portions P to the width of the noise bands N is approximately one to one. Exactly the same applies to the case of a high speed rewinding reproduction mode. This means that by using the inventive magnetic video reproducing apparatus a magnetic tape having a video signal recorded in a standard play mode can be reproduced at a high speed to the extent fully practicable. More specifically, the purpose of high speed reproduction is not to enjoy watching a picture of a high quality but rather to quickly look for a desired picture or to quickly skip an undesired picture and therefore a distributed appearance of the noise bands on the screen does not spoil the purpose of high speed reproduction itself inasmuch as a picture of a mixed arrangement of the picture portions P and the noise bands N can still afford enough information to discern the picture for the inherent purpose of high speed reproduction. Meanwhile, for the purpose of the present invention the speed ratio must be an odd number and the above described number of 9 should be taken by way of an example and not by way of limitation.

Figure 24A:
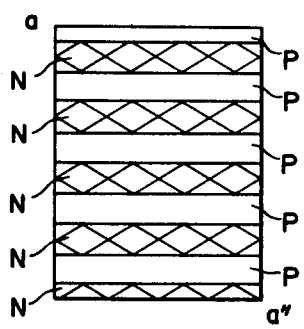
FIGS. 24A and 24B are views showing a picture of one field formed through tracing of the video heads Ha' and Hb', respectively.
Figure 24B:
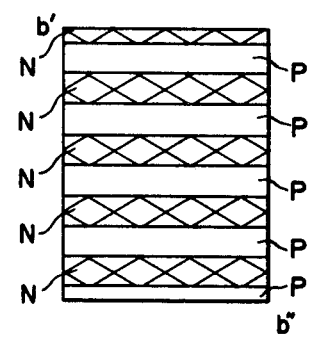
Figure 24C:
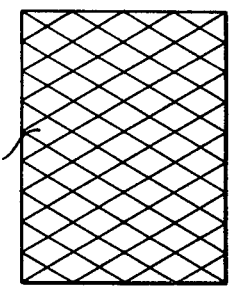
FIG. 24C is a view showing a picture of one frame through composition of the pictures of both fields.
Figures 23A, 23B:
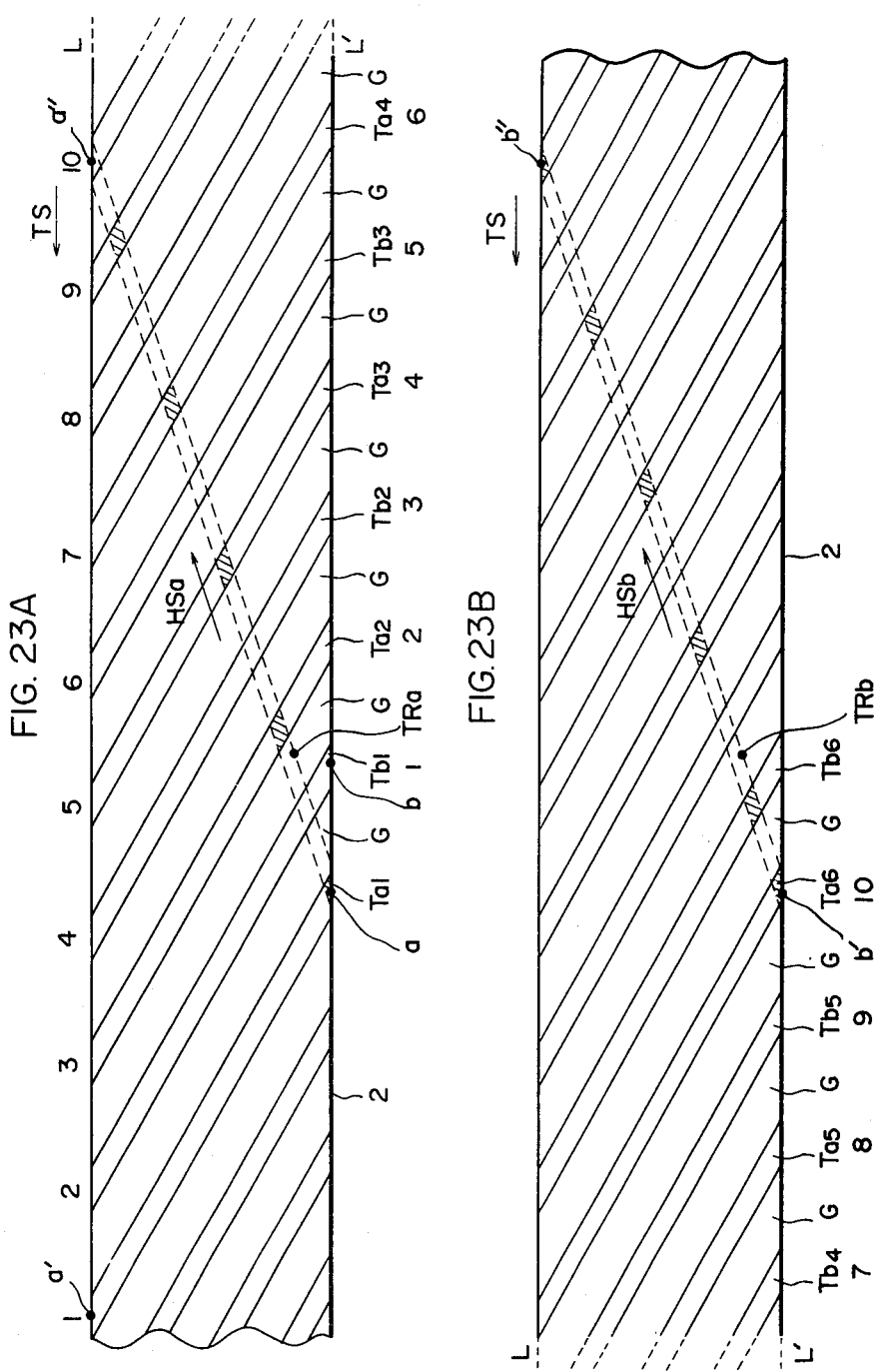
FIGS. 23A and 23B are views showing loci of the video heads in the case where a magnetic tape having a video signal recorded in a standard play mode is reproduced in a high speed rewinding reproduction fashion at the speed ratio of 10 using the inventive magnetic video recording apparatus.

The reason why the speed ratio must be an odd number can be best accounted for by describing what happens when a magnetic tape having a video signal recorded in a standard play mode is reproduced in a high speed reproduction fashion at the speed ratio of 10 taken by way of an example of an even number close to the above described odd number of 9. FIGS. 23A and 23B are views showing the loci of the video heads in the case where a magnetic tape having a video signal recorded in a standard play mode is reproduced in a high speed winding reproduction fashion at the speed ratio of 10 using the inventive magnetic video reproducing apparatus. The different points of the views shown in FIGS. 23A and 23B from those shown in FIGS. 21A and 21B is that the positions of the portions where a video signal is picked up by the video heads Ha' and Hb' have been dislocated from each other. Accordingly, a picture on the screen formed through tracing of a magnetic tape by the video heads Ha' and Hb' becomes as shown in FIGS. 24A and 24B, respectively. It is clearly seen that the positions of the noise bands in the FIG. 24A picture have been totally dislocated from the positions of the noise bands N appearing in the FIG. 24B picture. Accordingly, a picture of one frame formed through composition of the pictures of the above described fields becomes as shown in FIG. 24C, in which case the noise bands are scattered throughout the whole area of the screen. As a result of experimentation, it has been observed that such a picture as seen in FIG. 24C obtained on the occasion of the speed ratio of 10 can hardly or never been used for purpose of high speed reproduction. Exactly the same applies to the speed ratio of any other even number. Thus it would be appreciated why the speed ratio of a given odd number was adopted for the purpose of the present invention.

Figure 1:
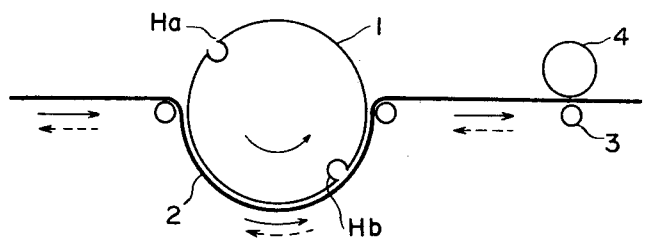
FIG. 1 is a diagrammatic view showing a rotational two-head system.
Figure 3A:
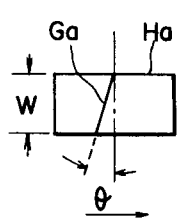
FIGS. 3A and 3B are diagrammatic views showing an azimuth system.
Figure 3B:
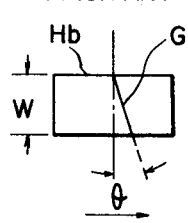
Figure 2:
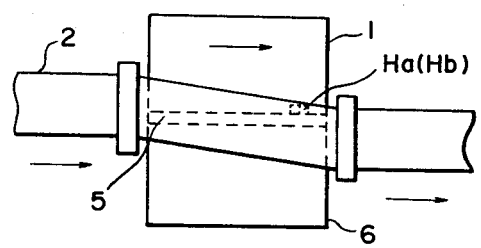
FIG. 2 is a diagrammatic view showing a helical scan system.
Figure 4:
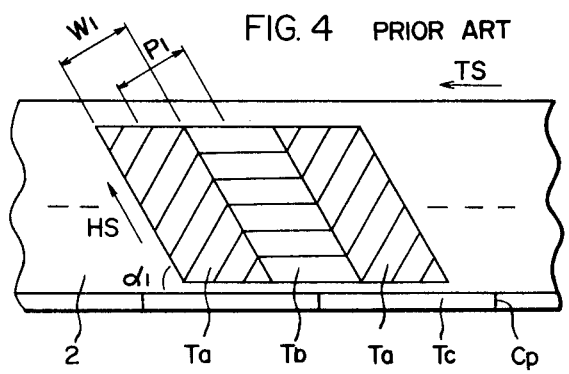
FIG. 4 is a diagrammatic view showing a tape pattern of a magnetic aspect in a standard play mode.
Figure 5:
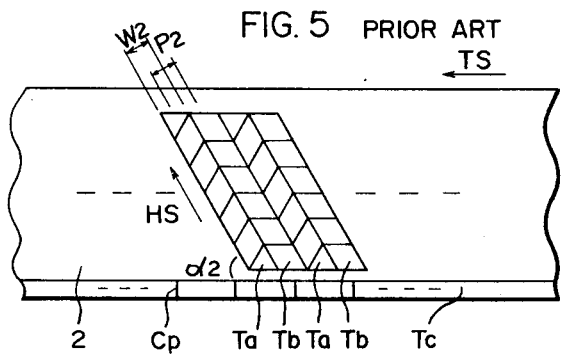
FIG. 5 is a diagrammatic view showing a tape pattern in an extended play mode.
Figure 6:
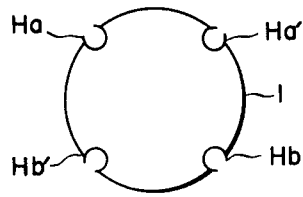
FIG. 6 is a diagrammatic view showing a rotational four-head system.
Figure 7:
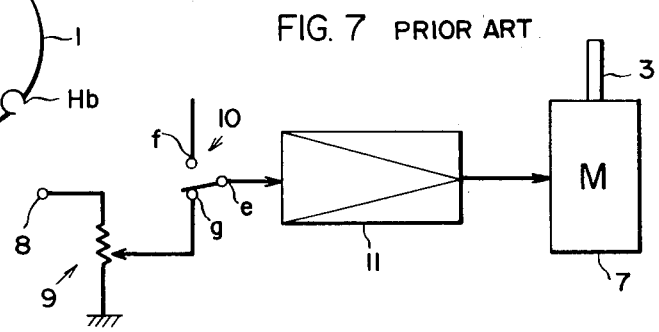
FIG. 7 is a block diagram showing a conventional capstan motor control circuit for high speed reproduction.
Figure 8:
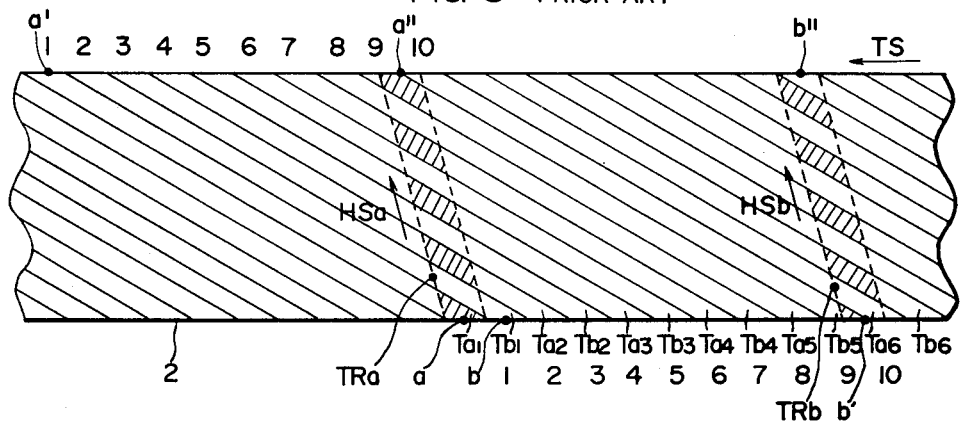
FIG. 8 is a diagrammatic view showing loci of the video heads when a magnetic tape having a video signal recorded in an extended play mode is reproduced in a high speed winding reproduction fashion at the speed ratio of 9.5.
Figure 9A:
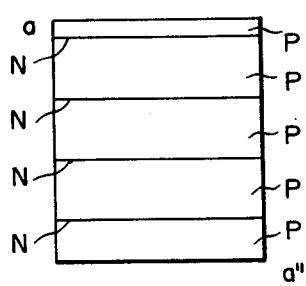
FIGS. 9A and 9B are views each showing a picture of one field formed through tracing by the video heads Ha' and Hb', respectively.
Figure 9B:
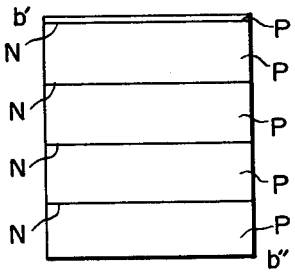
Figure 9C:
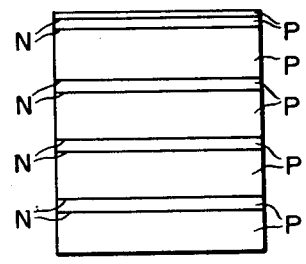
FIG. 9C is a view showing a picture of one frame through composition of the pictures of both fields.
Figure 10:
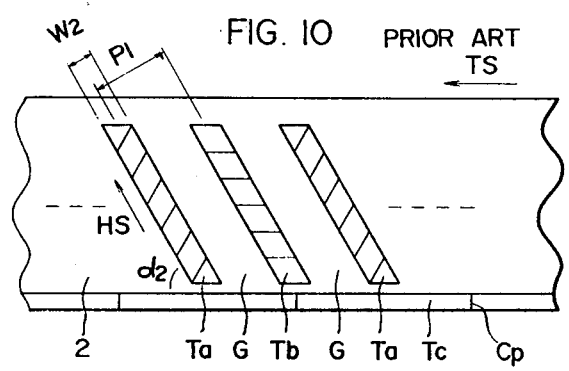
FIG. 10 is a view showing a tape pattern having a video signal recorded in a standard play mode using the video heads for an extended play mode.

Finally, it would be also readily appreciated that the same picture as shown in FIG. 9A or 9B appears on the screen in the case where a magnetic tape having a video signal recorded in an extended play mode is reproduced in a high speed reproduction mode. Furthermore, it would be also readily appreciated the same picture as shown in FIG. 22C appears on the screen in the case where a prerecorded tape commercially available having a video signal recorded in a standard play mode using the video heads designed for a standard play mode is reproduced in a high speed reproduction mode. In such a case, however, the experimentation result indicates that the ratio of the width of the picture portions P to the width of the noise bands N on the screen becomes approximately three to one and the picture quality of a picture on the occasion of high speed reproduction would be enhanced as compared with that shown in FIG. 22C.

Although the present invention has been described and illustrated in detail, it is clearly understood that the same is by way of illustration and example only and is not to be taken by way of limitation, the spirit and scope of the present invention being limited only by the terms of the appended claims.

We claim:

1. A magnetic video reproducing apparatus employing a rotational two-head system including two video heads provided on the circumference of a rotational drum spaced apart by 180° from each other, a helical scan system for causing a recording medium to travel obliquely with respect to the rotational direction of said video heads, and an azimuth system in which said two video heads each having a gap are provided such that gaps of said two video heads extend with the angles intersecting each other, said apparatus being used for reproducing a video signal recorded on a recording medium and having a video track pitch larger than the width of said video head and further having a control signal for use in control, said magnetic video reproducing apparatus having a plurality of modes of operation including an ordinary reproduction mode for causing said recording medium to travel at an ordinary speed and a high speed reproduction mode for causing said recording medium to travel at a high speed faster than said ordinary speed, said magnetic video reproducing apparatus comprising, a capstan for mechanically causing said recording medium to travel, capstan driving means for mechanically driving said capstan, driving means state signal generating means for generating an output signal indicative of an operating characteristic of said capstan driving means and of travel characteristics of said recording medium, control signal extracting means for extracting a control signal recorded in said recording medium and for generating an output signal responsive thereto, capstan servo circuit means responsive to the output from said driving means state signal generating means and to the output signal from said control signal extracting means for controlling the travel characteristics of said recording medium to have a predetermined speed and a predetermined phase, mode selecting means connected to said capstan servo circuit means for selecting any one of said plurality of modes of operation including said ordinary reproduction mode and said high speed reproduction mode, and speed ratio setting means coupled to said capstan servo circuit means and responsive to said mode selecting means for causing said capstan servo circuit means to set the driving speed of said recording medium in said high speed reproduction mode to be a predetermined odd integer multiple of the driving speed of said recording medium in said ordinary reproduction mode.

2. A magnetic video reproducing apparatus in accordance with claim 1, wherein
said capstan servo circuit means comprises
reference signal generating means for generating a reference signal,
phase control means responsive to said control signal extracting means and to said reference signal generating means for controlling a driving phase of said recording medium,
speed control means responsive to said driving state signal generating means and to said phase control means for controlling the travel speed of said recording medium, and
electrical driving means coupled to said speed control means and to said capstan driving means and responsive to an output signal from said speed control means for electrically driving said capstan driving means.

3. A magnetic video reproducing apparatus in accordance with claim 2, wherein
said speed ratio setting means comprises
first speed ratio setting means coupled between said control signal extracting means and said phase control means for setting a first ratio of the output signal from said control signal extracting means to an input to said phase control means, and
second speed ratio setting means coupled between said driving state signal generating means and said speed control means for setting a second ratio of the output signal from said driving state signal generating means to an input to said speed control means.

4. A magnetic video reproducing apparatus in accordance with claim 3, wherein
said first speed ratio setting means comprises
first ratio means for setting said first ratio to unity,
second ratio means for setting said first ratio to a predetermined odd number, and
first switch means coupled to said first and second ratio means and responsive to said mode selecting means for selecting one of said first and second ratio means, and
said second speed ratio setting means comprises
third ratio means for setting said second ratio to unity,
fourth ratio means for setting said second ratio to said predetermined odd number, and
second switch means coupled to said third and fourth ratio means and responsive to said mode selecting means for selecting the corresponding one of said third and fourth ratio means.

5. A magnetic video reproducing apparatus in accordance with claim 4, wherein
said control signal extracting means and said driving state signal generating means are each structured to provide a pulse signal,
said second ratio means for settings said first ratio to said predetermined odd number comprises first frequency dividing means for dividing the frequency of said pulse signal from said control signal extracting means by said predetermined odd number, and
said fourth ratio means for setting said second ratio to said predetermined odd number comprises second frequency dividing means for dividing the frequency of said pulse signal from said driving state signal generating means by said predetermined odd number.

6. A magnetic video reproducing apparatus in accordance with claim 5, wherein
said phase control means comprises
a first differentiating circuit for differentiating a leading edge of said reference signal,
a first ramp signal generating circuit responsive to said first differentiating circuit for providing a ramp signal, and
a first sample and hold circuit coupled to said first ramp signal generating circuit and responsive to an output signal from said first speed ratio setting means for sampling and holding the ramp signal from said first ramp signal generating circuit.

7. A magnetic video reproducing apparatus in accordance with claim 6, wherein
said speed control means comprises
a second differentiating circuit for differentiating the leading edge of the output signal from said second speed ratio setting means,
a second ramp signal generating circuit responsive to said second differentiating circuit for providing a ramp signal,
a polarity inverting circuit for inverting the polarity of the output signal from said second speed ratio setting means,
a third differentiating circuit coupled to said polarity inverting circuit for differentiating a leading edge of an output signal from said polarity inverting circuit,
a delay circuit responsive to said third differentiating circuit and to said phase control means for delaying the output signal from said third differentiating circuit, and
a second sample and hold circuit connected to said second ramp signal generating circuit and to said delay circuit and responsive to an output signal from said delay circuit for sampling and holding the ramp signal from said second ramp signal generating circuit to provide an output signal to said electrical driving means.

8. A magnetic video reproducing apparatus in accordance with claim 5, 6 or 7, wherein
said electrical driving means comprises
amplifying means connected to said speed control means for amplifying the output signal from said speed control means and outputting an output signal, and
third switch means connected to said amplifying means, said mode selecting means and said capstan driving means and responsive to said mode selecting means for inverting the polarity of the output signal from said amplifying means, and for outputting an output signal to said capstan driving means, whereby the travel direction of said recording medium is reversed.

9. In a two-head tape reproducing system having a helical scan system and an azimuth system, including a driven capstan for providing travel of the tape relative to a drum having said two heads disposed on opposite sides thereof, and controllable driving means for said capstan, the improvement comprising:

apparatus for high-speed playback of a magnetic tape having alternating oblique signal tracks recorded by alternating heads at a pitch greater than a width dimension of said heads, including first sensing means for detecting a sequence of control pulses recorded on said tape and outputting a first signal representative thereof, second sensing means for detecting a rotational speed of said capstan and outputting a second signal representative thereof, and control means responsive to said first and second signals for controlling said controllable driving means to drive said capstan at said high speed and to maintain a predetermined ratio between said high speed and the speed at which said tracks were recorded on the tape, said control means operable for enabling each of said two heads to scan a plurality of tracks and to output substantially overlapping noise bands and video information bands for corresponding fields of a frame scanned thereby, whereby said high speed playback results in viewable images having alternating information and noise bands.

10. An improved tape reproducing system as recited in claim 9 wherein said control means includes mode selecting means generating mode select signals selecting operation for selecting operation of the reproducing system in one of a plurality of operating speeds, phase and speed control means providing speed control signals to said controllable driving means for said capstan, and means connected to said first and second sensing means for providing said first and second signals directly or in a frequency divided format to said phase control and speed control means in response to said mode select signals, thereby to control the speed and phase for said driven capstan.

11. The improved tape reproducing system recited in claim 9 wherein said controllable driving means further includes means for reversing the travel direction of the tape, including means operable in response to said mode selector for inverting the polarity of said speed control signal.

* * * * *